US 6,570,887 B2

(12) United States Patent
Mehta et al.

(10) Patent No.: US 6,570,887 B2
(45) Date of Patent: *May 27, 2003

(54) METHOD AND APPARATUS EMPLOYING ASSOCIATIVE MEMORIES TO IMPLEMENT MESSAGE PASSING

(75) Inventors: Kalpesh D. Mehta, Chandler, AZ (US); Krishna Shetty, Chandler, AZ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/235,867

(22) Filed: Jan. 22, 1999

(65) Prior Publication Data

US 2002/0085572 A1 Jul. 4, 2002

(51) Int. Cl.$^7$ .................... H04B 7/212; H04Q 11/00; H04L 12/50; H04L 12/00; G06F 12/00
(52) U.S. Cl. .................... 370/442; 370/347; 370/363; 370/382; 711/108; 711/202
(58) Field of Search ............... 370/442, 366, 370/378, 379, 466, 477, 376, 321, 337, 347, 352, 401, 398, 399; 709/212; 711/101, 202, 207

(56) References Cited

U.S. PATENT DOCUMENTS

| | | | | |
|---|---|---|---|---|
| 3,599,160 A | | 8/1971 | Neptune et al. | |
| 4,071,703 A | | 1/1978 | Schaffter | |
| 4,093,827 A | * | 6/1978 | Charransol et al. | 370/366 |
| 4,370,742 A | * | 1/1983 | Minamitani et al. | 370/381 |
| 4,392,221 A | * | 7/1983 | Hesketh | 370/366 |
| 4,450,557 A | | 5/1984 | Munter | |
| 4,470,139 A | | 9/1984 | Munter | |
| 4,510,597 A | | 4/1985 | Lewis | |
| 4,616,360 A | | 10/1986 | Lewis | |
| 4,638,474 A | | 1/1987 | Chalet | |
| 4,639,910 A | | 1/1987 | Toegel et al. | |
| 4,656,626 A | | 4/1987 | Yudichak et al. | |
| 4,759,010 A | * | 7/1988 | Murata et al. | 370/379 |
| 4,759,012 A | * | 7/1988 | Suzuki | 370/379 |
| 4,905,226 A | * | 2/1990 | Kobayashi | 370/378 |
| 4,918,597 A | | 4/1990 | Krishnan et al. | |
| 4,922,416 A | * | 5/1990 | Krishnan | 709/212 |
| 5,031,094 A | | 7/1991 | Toegel et al. | |
| 5,060,227 A | * | 10/1991 | Finley et al. | 370/466 |
| 5,381,406 A | * | 1/1995 | Yamashita | 370/376 |
| 5,422,838 A | | 6/1995 | Krishnan et al. | |
| 5,515,428 A | * | 5/1996 | Sestak et al. | 379/266.01 |
| 5,539,816 A | * | 7/1996 | Pinard et al. | 379/229 |
| 5,790,545 A | * | 8/1998 | Holt et al. | 370/398 |
| 6,034,965 A | * | 3/2000 | Pollack et al. | 370/442 |
| 6,067,296 A | * | 5/2000 | Heering et al. | 370/363 |
| 6,070,223 A | | 5/2000 | Yoshikawa et al. | |

* cited by examiner

Primary Examiner—Wellington Chin
Assistant Examiner—M. Phan
(74) Attorney, Agent, or Firm—Blakely, Sokoloff, Taylor & Zafman LLP (57) ABSTRACT

A method for employing an associative memory to implement a message passing switch. The method comprising the step of receiving data in a time slot. The method also comprising the step of examining an interrupt register to determine if the data is a message. Additionally, the method comprises the step of storing the data in a memory location and transferring the data to an external device.

13 Claims, 7 Drawing Sheets

METHOD AND APPARATUS EMPLOYING ASSOCIATIVE MEMORIES TO IMPLEMENT MESSAGE PASSING

FIELD OF THE INVENTION

The present invention relates to data transfer in a time division multiplexing environment. More particularly, the present invention relates to using associative memories to implement a limited switching scheme that generates and receives messages in a time division multiplexing environment.

BACKGROUND

Improvements in communications networks have led to robust designs that support multiple devices connected to a single bus. Typically the supported devices consist of microprocessors, memory devices, digital to analog converters, analog to digital converters, digital signal processing devices, printers, modems, and universal serial bus hubs. The communication between the multiple devices is governed by the type of network and the band width of the individual devices. A conventional communication scheme that reduces connection costs while increasing portability between devices is a shared serial interface.

In a shared serial interface, each device coupled to the shared interface transmits/receives data on the shared serial bus. Typically, the shared serial bus includes a data line, a clock, and control signals. In the prior art, a full-switch in conjunction with a time division multiplexing ("TDM") scheme is used to schedule the transmission of data across the shared serial bus. TDM is the division of a time interval, also denoted as a frame, into a number of equal sub-intervals called time slots. The beginning of each time frame is typically identified by a start of frame ("SOF") signal transmitted along the shared serial bus. The TDM scheme allocates one or more time slots to each device coupled to the shared serial bus. Accordingly, the device can only transmit/receive data on an assigned time slot(s). The allocation of time slots and transmit commands is maintained by the full-switch.

Figure 1:
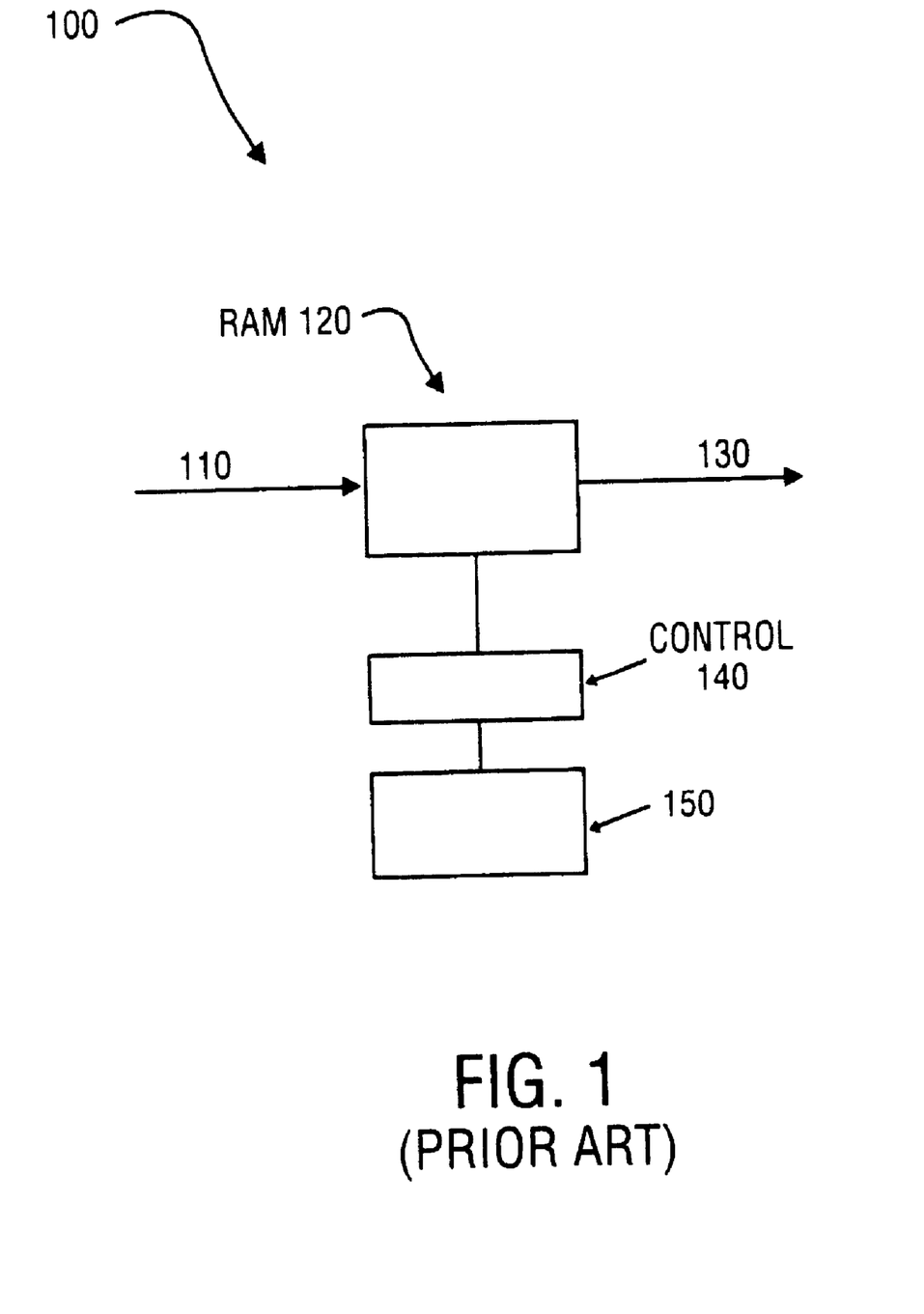
FIG. 1 shows a prior art full-switch time multiplexing division circuit.

FIG. 1 illustrates a prior art full-switch TDM system. In particular, system 100 includes input 110, memory devices (RAM 120 and 150), output 130, and control 140. Input 110 transfers the serial data from each transmitting device—typically referred to as an incoming TDM stream—to system 100. Output 130 transmits serial data from system 100—typically referred to as an outgoing TDM stream—to each receiving device.

Control 140 switches the data stream on input 110 to create a different output stream on output 130, thus creating a switching mechanism between different devices coupled to input 110 and output 130. Specifically, control 140 sequentially writes data for each time slot into an address of RAM 120. For example, data received in the first time slot is written into the first address of RAM 120 and data received in the second time slot is written into the second address of RAM 120. As previously described, each time slot corresponds to a different device transmitting data. Thus, in the present example, device one writes data to the first memory address of RAM 120 and device two writes data to the second memory address of RAM 120. After writing the input data stream to RAM 120, control 140 uses memory 150 to generate an output data stream.

As illustrated in FIG. 1, control 140 is also connected to memory 150. Each address of memory 150 corresponds to a specific time slot on the outgoing stream 130. Each address of memory 150 also contains connection information that determines which address of RAM 120 should be transmitted on output 130. For example, the third memory address of memory 150 stores data having a value of 'thirty-two.' Accordingly, during time slot 3, the data stored in the thirty-second memory address of RAM 120, from a previous time frame, is transmitted on output 130. Thus, resulting in the transfer of data from the device transmitting on slot thirty-two to a specific device that receives data in the third time slot. The specific device that receives data during the third time slot is pre-determined by system 100.

A full-switch TDM system provides a data transfer mechanism that switches data between all time slots in any given order. Thus, the full-switch TDM system allows any two devices coupled to the shared serial line to transfer data. The full-switch TDM system, however, results in numerous disadvantages.

One disadvantage of using a full-switch TDM system results from the size requirements of RAM 120 and memory 150. In a thirty-two time slot TDM scheme, both RAM 120 and memory 150 require thirty-two rows of memory cells. The large memory requirements result in system 100 using a significant area. The large memory requirements also result in an increased cost for system 100.

Another disadvantage of using a full-switch TDM system results from a network system where all the time slots in the TDM scheme are not required. For example, in a thirty-two time slot TDM scheme used in a system with only four devices only the first four memory addresses of RAM 120 and memory 150 are used during data transfer. In this network environment, memory locations five through thirty-two of RAM 120 and memory 150 remain unused.

SUMMARY OF THE INVENTION

A method for employing an associative memory to implement a message passing switch is disclosed. The method comprises the step of receiving data in a time slot. The method also comprises the step of examining an interrupt register to determine if the data is a message. Additionally, the method comprises the step of storing the data in a memory location and transferring the data to an external device.

Other features and advantages of the present invention will be apparent from the accompanying drawings and from the detailed description that follows.

BRIEF DESCRIPTION OF THE DRAWINGS

The features and advantages of the present invention are illustrated by way of example and not limitation in the figures of the accompanying drawings in which like references indicate similar elements and in which.

DETAILED DESCRIPTION

An apparatus and method for employing associative memories to implement limited switching and message passing in a time division multiplexing ("TDM") system is disclosed. Limited switching provides an efficient data transfer mechanism that uses a subset of the TDM time slots to transfer data between components. For one embodiment, the limited switch is used to transfer data between components coupled via a serial bus. In particular, the limited switch transfers data between the time slots of an incoming TDM stream and an outgoing TDM stream. For an alternative embodiment, the limited switch is used to insert data into the outgoing TDM stream. For yet another embodiment, instead of transfer data across the TDM stream, data from an incoming TDM stream is stored in the limited switch. The insertion or, alternatively, the termination of data in the limited switch is hereinafter referred to as message passing.

An intended advantage of an embodiment of the present invention is to reduce the size of switching systems used in TDM systems. For one embodiment, a limited switch is used in conjunction with associative memories to reduce the size of the switching system.

Another intended advantage of an embodiment of the preset invention is to provide message passing in a TDM system. For one embodiment, a limited switch is used to perform the message passing.

In a computer system several peripheral devices are coupled to a shared bus. The shared bus allows each peripheral device to communicate with a controller and share valuable resources without an intricate wiring scheme. For one embodiment, the shared bus is a serial bus and an enhanced serial interface is used to govern the communication between the peripheral devices and the controller.

Figure 2:
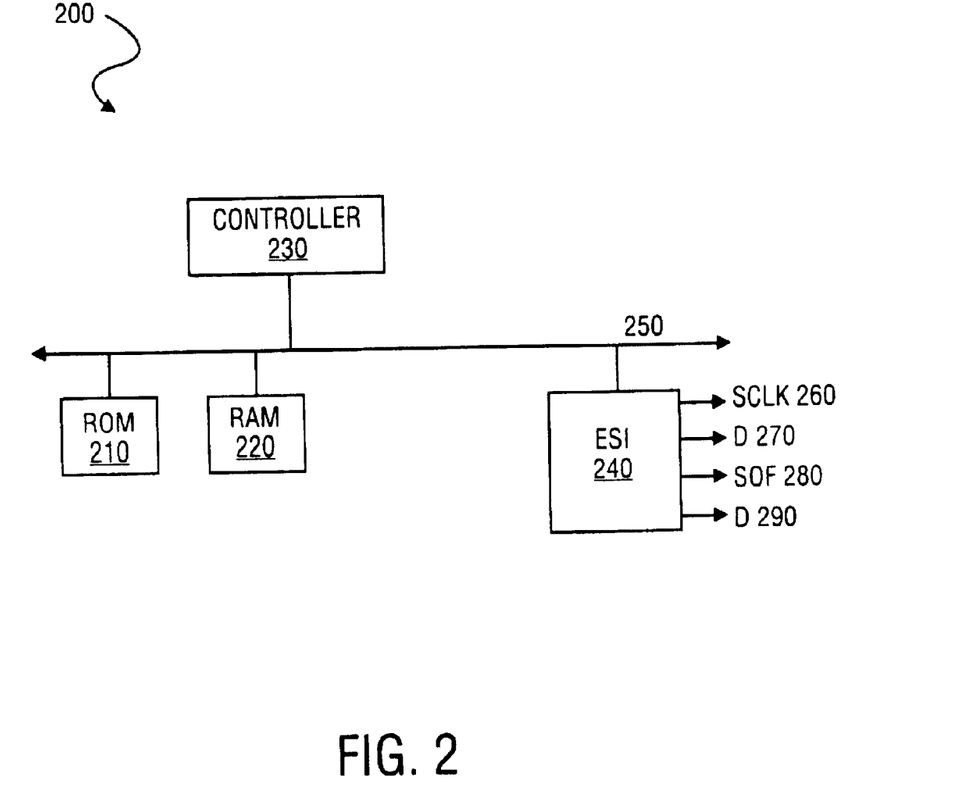
FIG. 2 shows one embodiment of a data transfer system using an enhanced serial interface.

FIG. 2 shows one embodiment of a data transfer system using an enhanced serial interface. In particular, system 200 includes controller 230 coupled to ROM 210, RAM 220, and enhanced serial interface ("ESI") 240 via bus 250. For one embodiment, bus 250 is a thirty-two bit bus. For an alternative embodiment, a universal serial bus device is coupled to data bus 250.

ESI 240 controls the data transfer between peripheral devices (not shown) coupled to system 200. As illustrated in FIG. 2, ESI 240 is coupled to signal lines SCLK 260, D270, D290, and SOF 280. The signal lines allow ESI 240 to communicate with the peripheral devices. Specifically, SCLK 260 is a serial clock signal used to synchronize data transmission between ESI 240 and the peripheral devices (not shown) coupled to D270 and D290. D270 is a serial output used to transfer data from ESI 240 to the peripheral devices. D290 is a serial input used to transfer data from the peripheral devices to ESI 240.

For one embodiment, system 200 is a TDM system and ESI 240 includes a limited switch. In a TDM system, RAM 220 provides a temporary data storage medium for data available on bus 250. Additionally, ROM 210 is used to initialize the switching mechanism of the limited switch and other peripherals. For example ROM 210 is used to the store number of time slots switched, control signals, and switching parameters. In a TDM system a start of frame signal is necessary to delineate frame boundaries. ESI 240 generates a start of frame signal on SOF 280. Accordingly, for a given frame, the limited switch allocates transmit/receive time slots for each peripheral device coupled to D270 and D290.

In particular, the limited switch controls the switching of data between the TDM data stream received on input D290 and the TDM data stream transmitted on D270. As previously described, each time slot of the output data stream is allocated to a specific device. Thus, the switching of the transmitted TDM data stream results in a first peripheral device transmitting data to a second peripheral device. For an alternative embodiment, the start of frame signal is generated by a peripheral device, accordingly, SOF 280 is an input to ESI 240.

Figure 3:
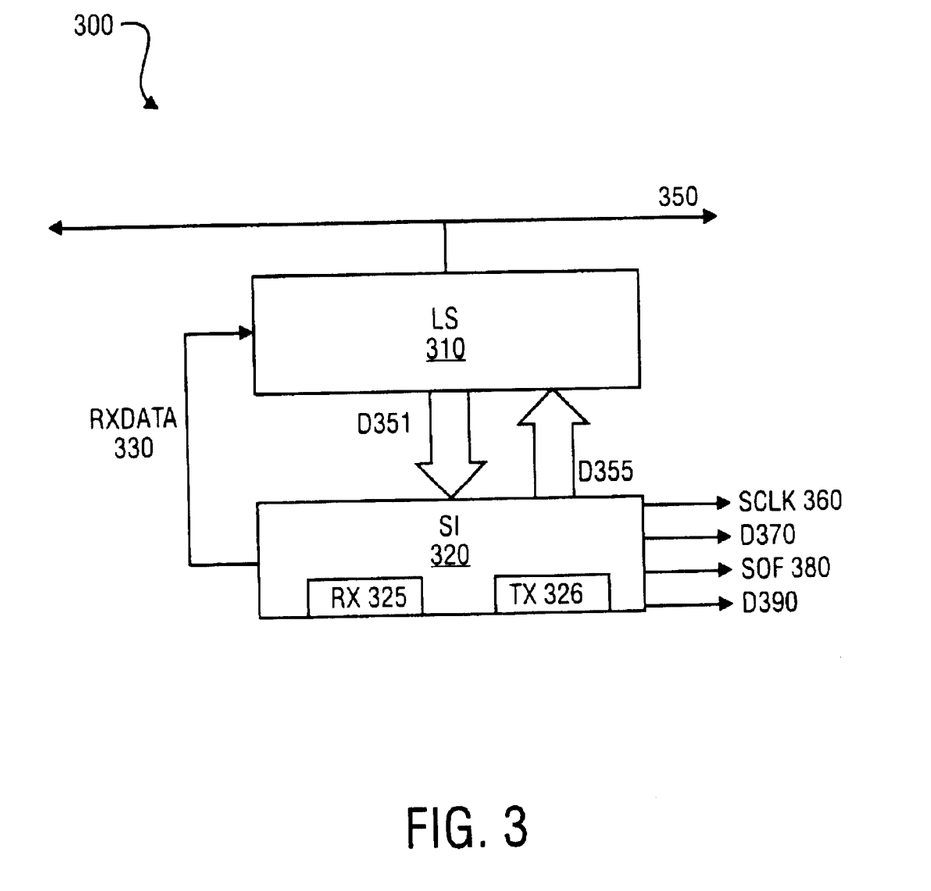
FIG. 3 shows one embodiment of an enhanced serial interface including a limited switch.

FIG. 3 shows one embodiment of an enhanced serial interface including a limited switch. In particular, system 300 includes a serial interface (SI 320) coupled to a limited switch (LS 310). LS 310, in turn, is coupled to bus 350. For one embodiment, the combination of LS 310 and SI 320 corresponds to ESI 240 of FIG. 2.

As further illustrated in FIG. 3, SI 320 is coupled to signal lines SCLK 360, D370, D390, and SOF 380. The signal lines allow SI 320 to communicate with peripheral devices (not shown). Specifically, SCLK 360 is a serial clock signal used to synchronize data transmission between SI 320 and the peripheral devices coupled to D370 and D390. D370 is a serial output used to transfer data from SI 320 to the peripheral devices. D390 is a serial input used to transfer data from the peripheral devices to SI 320 and SOF 380 is used to indicate a start of frame signal.

SI 320 stores serial data received on serial input D390 in buffer RX325. For one embodiment, buffer RX325 stores data for only one time slot. Thus, after the arrival of all the serial data for a given time slot, SI 320 informs LS 310 that new data is available via RXDATA 330. Subsequently, LS 310 issues a write command and the data stored in buffer RX325 is transferred in parallel to LS 310 via bus D355. Similarly, to transmit data on serial output D370, LS 310 issues a read command and data is transferred in parallel to buffer TX326 via bus D351. Subsequently, SI 320 transmits the data stored in TX 326 via serial output D370. For an alternative embodiment, SI 320 includes multiple buffer RX325s, thus allowing the storage of data from multiple time slots prior to the parallel transfer to LS 310. For another embodiment, SI 320 includes multiple buffer TX326s, thus allowing the storage of data from multiple time slots prior to serial transmission on D370.

As previously described, for one embodiment, the combination of LS 310 and SI 320 corresponds to ESI 240. The serial to parallel conversion allows LS 310 to operate on the same clock frequency as controller 230 while SI 320 operates in the SCLK 360 frequency domain. For example, for one embodiment, both controller 230 and LS 310 operate at a higher clock frequency than SCLK 360. For one embodiment, controller 230 is operable to dynamically change the switching parameters of LS 310 via bus 350. Specifically, controller 230 loads new switching parameters in the memory components of LS 310. Subsequently, the new switching parameters are used by LS 310 to determine the data transfer between an input TDM stream on D390 and an output TDM stream in D370.

The SCLK 360 clock signal is used to transfer data between SI 320 and input D390 or output D 370. In particular, after a multiple of SCLK 360 clock cycles, buffer RX325 transfers data to LS 310—the data equates to all the serial data transmitted from a peripheral device to SI 320 in a given time slot. Similarly, after a multiple of SCLK 360 clock cycles, buffer TX 326 transfers data from SI 320 to D370—the data equates to all the serial data transmitted from SI 320 to a peripheral device in a given time slot. For one embodiment, D351 and D355 are eight bit busses. Accordingly, data is transferred from buffer RX325 to LS 310 after eight SCLK 360 clock cycles.

Figure 4:
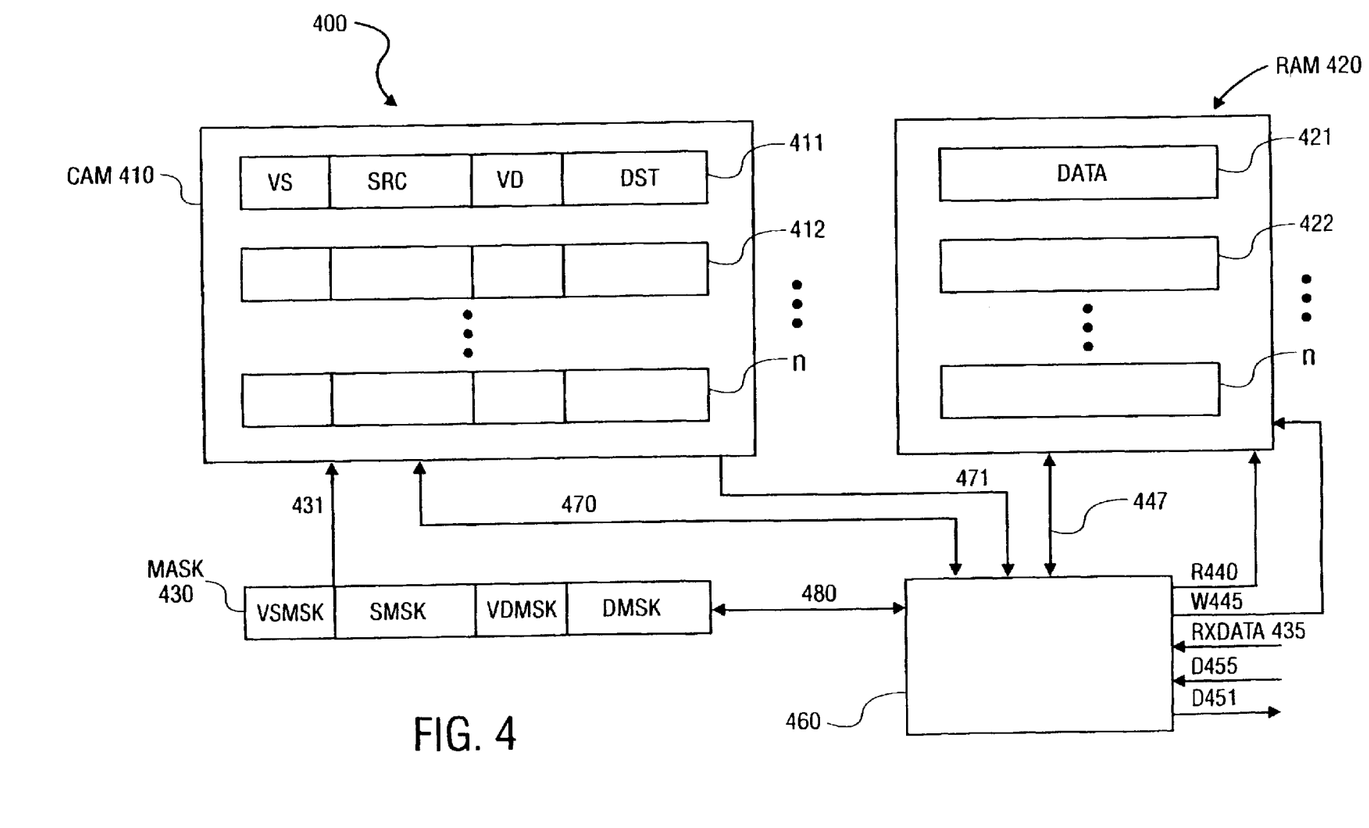
FIG. 4 shows one embodiment of a limited switch.

FIG. 4 shows one embodiment of a limited switch. In particular, limited switch 400 includes input D455, input RXDATA 435, and output D451. For one embodiment, limited switch 400 is used in conjunction with a serial interface, such as SI 320, to form the enhanced serial interface (SI 240) of TDM system 200.

Limited switch 400 includes an associative memory—i.e. a content addressable memory array—(CAM 410), a random access memory array (RAM 420), a mask register (MASK 430), and a control (460). CAM 410 includes a plurality of entries (411, 412, ... n). For one embodiment, each entry of CAM 410 includes a valid source bit (VS), source address bits (SRC), a valid destination bit (VD), and destination address bits (DST). The SRC address is used to identify a time slot corresponding to TDM data received by limited switch 400. Similarly, the DST address is used to identify a time slot corresponding to TDM data transmitted by limited switch 400. Additionally, the VS bit and the VD bit indicate that a specific CAM 410 entry includes a valid source address and a valid destination address, respectively.

For one embodiment, the number of entries in CAM 410 is determined by the number of time slots switched by limited switch 400. For example, in a thirty-two time slot TDM system with only four time slots switched during a given frame, CAM 410 includes four entries. For an alternative embodiment, the width of each entry (411, 412, ... n) is determined by the number of time slots. For instance, a thirty-two time slot TDM system results in a five bit addressing scheme. Thus, both SRC and DST include five bits, resulting in each entry of CAM 410 including twelve bits—1 (VS bit)+5 (SRC bits)+1 (VD bit)+5 (DST bits). For one embodiment, entries (411, 412, ... n) are loaded into CAM 410 from control 460 via bus 470. Thus, bus 470 also comprises twelve bits—1 VS bit, 5 SRC bits, 1 VD bit, and 5 DST bits. For an alternative embodiment, CAM 410 includes eleven bits. Accordingly, the VS and VD bits are combined into a one bit field designated as VSVD. Additionally, the MASK 430 fields VSMSK and VDMSK are combined into a one bit field designated as VSVDMSK. The eleven bit wide CAM 410 is operable to perform limited switching because the valid destination and source bits are combined into one bit.

Limited switch 400 also includes RAM 420. RAM 420 serves as a buffer to store TDM data. Similar to CAM 410, RAM 420 includes a plurality of rows (421, 422, ... n). Each row stores data for a given time slot. Additionally, each row in RAM 420 is associated with an entry in CAM 410. Thus, following the previous example, RAM 420 includes four rows, each row corresponding to a single entry of CAM 410. The width of each row (421, 422, ... n) is determined by the data width of a time slot. For example, if each time slot transfers W bits of data, then each RAM row (421,422, ... n) stores W bits of data. For one embodiment, rows (421, 422, ... n) are loaded into RAM 420 from control 460 via line 447. For an alternative embodiment, control 460 issues read and write commands to RAM 420 via signal lines R440 and W445, respectively. The read commands are operable to transfer data from RAM 420 to output D451. Alternatively, the write commands are operable to transfer from input D455 to RAM 420.

As further illustrated in FIG. 4, limited switch 400 also includes MASK 430 coupled to CAM 410 via line 431. MASK 430 includes a valid source mask bit (VSMSK), source address mask bits (SMSK), a valid destination mask bit (VDMSK), and destination address mask bits (DMSK). For one embodiment, the MASK bits of MASK 430 are loaded into MASK 430 from control 460 via line 480. Control 460 uses MASK 430, in conjunction with the data on bus 470, to determine if a specific CAM 410 entry includes matching data. To check the CAM 410 entries, the data stored in MASK 430 is used to mask fields of bus 470. The masked bus 470 fields are compared against each entry in CAM 410. For example, for one embodiment, MASK 430 includes a VSMSK value of logic '1,' a SMSK value of logic '11111,' a VDMSK value of logic '0,' and a DMSK value of logic '00000.' Thus, only the VS and SRC data included on bus 470 are compared against the CAM 410 entries.

For one embodiment, if an entry of CAM 410 matches with the masked contents of bus 470, the matching CAM 410 entry and the corresponding RAM 420 row are identified as a match via signal line 471. For another embodiment, logic (not shown) internal to CAM 410 generates a match signal when the masked contents of bus 470 and CAM 410 are equal. Accordingly, the RAM 420 entry corresponding to the selected (i.e. matched) CAM 410 entry is identified. For yet another embodiment, the logic used to identify the matching CAM 410 entry include combinational logic consisting of exclusive-or, NOR, and NAND gates (not shown).

The transfer of data between different time slots is controlled by control 460. In particular, for one embodiment, control 460 loads entries (411, 412, ... n) of CAM 410 with a set of switching requirements. Subsequently, based on the specific time slot and whether data is being read or written, control 460 loads mask register 430 and drives bus 470 with a set of given values. If the masked bus 470 bits specify a SRC address and a matching CAM 410 entry exists, then line 471 is set active high. Subsequently, control 460 transfers data from input D455 into the RAM 420 entry corresponding to the selected CAM 410 entry. For example, if the third entry of CAM 410 is matched, control 460 transfers data from input D455 into the third entry of RAM 420. If the masked bus 470 bits specify a DST address and matching CAM 410 entry exists, then line 471 is set active high. Subsequently, control 460 transfers data from a RAM 420 entry to output D451. The RAM 420 entry corresponds to the selected CAM 410 entry.

For one embodiment, the transfer of data from input D455 to RAM 420 is determined by input RXDATA 435 and W445. Specifically, if RXDATA 435 is set to a logical high, then valid data is available on input D455. Thus, for a given time slot, provided RXDATA 435 is a logical high and data switching is desired, limited switch 400 issues a write command via W455. The write command results in a data transfer from input D455 to RAM 420 via line 447.

For example, for one embodiment limited switch 400 is coupled to a serial interface (SI 320). As previously described, SI 320 stores the serial data for a single time slot in buffer RX325. Thus, to transfer the data of a given time slot from RX325, limited switch 400 issues a write command after SI 320 sets RXDATA 435 to an active high. RXDATA 435, however, is set to a logic high after the arrival of all the data for a given time slot. Accordingly, for one embodiment, for a given time slot limited switch 400 received data from a previous time slot. For an alternative embodiment, limited switch 400 operates on data in the same time slot the data is received. The timing between the issuance of a write command and a particular time slot is discussed below in FIG. 5.

For one embodiment, the transfer of data from RAM 420 to output D451 is determined by output R440 and line 471.

In particular, provided line 471 indicates a match, limited switch 400 issues a read command on R440. Subsequently, the data contents of the matched RAM 420 entry is transferred from RAM 420 to output D451 via line 447. For example, for one embodiment, limited switch 400 is coupled to a serial interface (SI 320). As previously described, prior to transmission SI 320 stores the parallel data for a single time slot in buffer TX326. Thus, to transfer the data of a given time slot from RAM 420 to buffer TX326, limited switch 400 issues a read command on output R440. The transmitted data, however, is stored in TX326 prior to serial transmission. Accordingly, for one embodiment, for a given time slot limited switch 400 transmits the data of a subsequent time slot. The timing between the issuance of a read command and a particular time slot is discussed below in FIG. 5.

Figure 5:
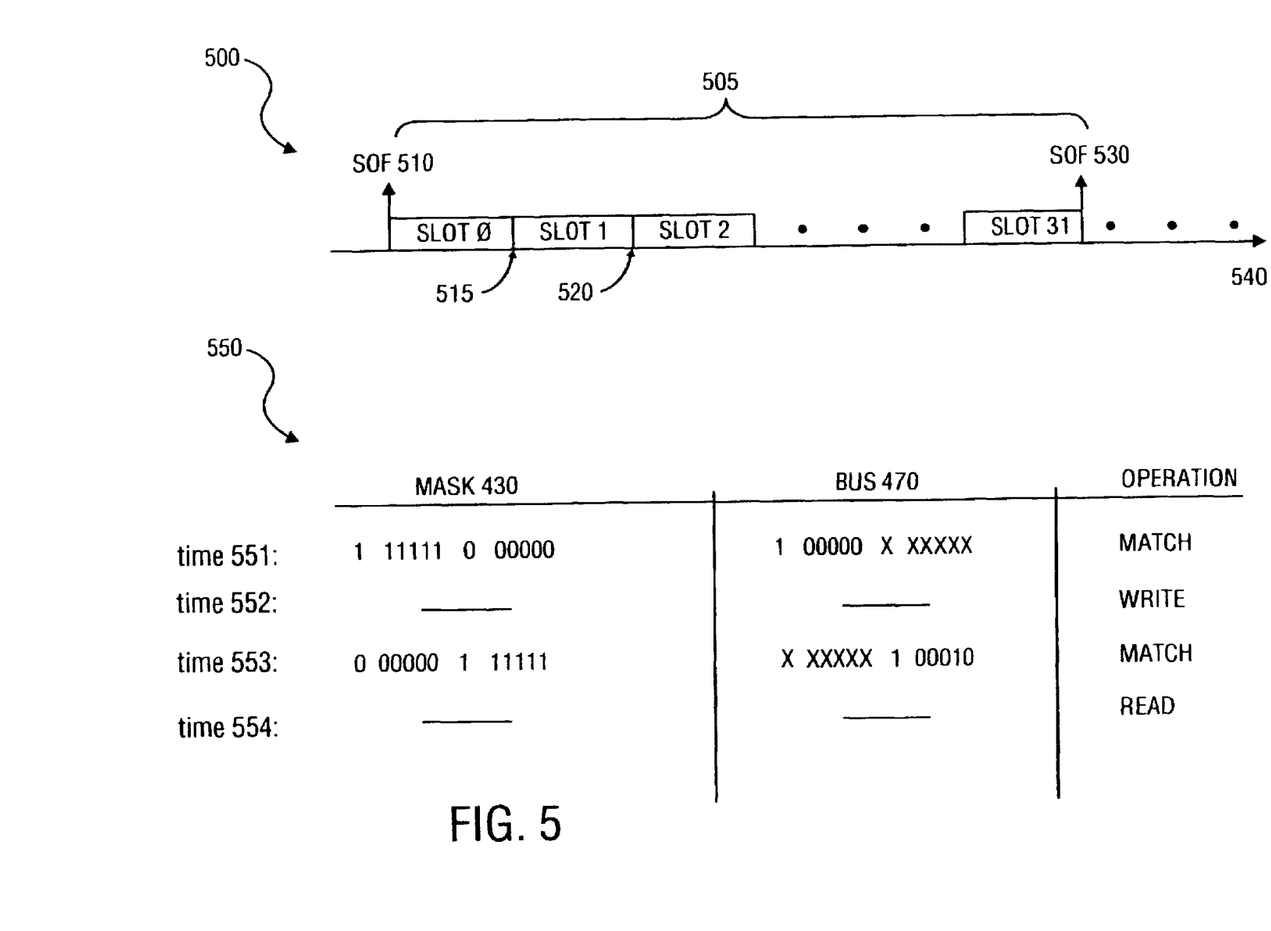
FIG. 5 shows one embodiment of a time diagram illustrating the switching of data by a limited switch.

FIG. 5 shows one embodiment of a time diagram illustrating the switching of data by a limited switch. In particular, timing diagram 500 includes a horizontal time axis (540) for a thirty-two slot TDM system. As shown in FIG. 5, a frame 505—denoted by start of frame signals SOF 510 and SOF 530—is divided in thirty-two time slots (Slot 0, Slot 1, . . . Slot 31). For one embodiment, limited switch 400 loads switching parameters into CAM 410 prior to SOF 510. Subsequently, control 460 loads values onto bus 470 and MASK 430 based on the current time slot and the desired switching condition. The loaded values select a specific CAM 410 entry and a corresponding RAM 420 entry. The RAM 420 entry is used to store and transfer the switched data.

For example, for one embodiment, during slot 1 limited switch 400 is operable to switch data between Slot 0 and Slot 2. Thus, effectively transferring data from a device that transmits data during Slot 0 to a device that receives data during Slot 2. To perform the data transfer, control 460 loads the value '100000100010' into entry 412 of CAM 410. Subsequently, control 460 loads values onto MASK 430 and bus 470 to perform the data transfer.

Table 550 illustrates the timing relationship between the operation of control 460 and the transfer of data between time slots. Specifically, table 550 shows the mask signals and bus 470 values used during Slot 1, to switch data between Slot 0 and Slot 2. Table 550 also includes time points 551–554. For one embodiment, time points 551–554 denote four clock cycles of control 460 during Slot 1.

As shown in FIG. 5, at time 551, VSMSK has a value of '1,' SMSK has a value of '11111,' VDMSK has a value of '0,' and DMSK has a value of '00000.' Additionally, at time 551, bus 470 has a value of '1' in the VS bit, a value of '00000' in the SRC bits, and the VD and DST bits have do not care values—denoted as 'X.' The values of MASK 430 and BUS 470 selects CAM 410 entries having a value of '100000XXXXXX.' Following the previous example, the MASK 430 and bus 470 values at time 552 select entry 412 of CAM 410. Thus, resulting in line 471 transitioning to an active high and indicating a match.

At time 552, in response to the match signal, control 460 issues a write command and data from input D455 is stored into entry 422 of RAM 420—the RAM 420 entry corresponding to CAM 410 entry 412. For one embodiment, limited switch 400 is used in conjunction with serial interface 320. Thus, during Slot 1, limited switch 400 switches data received prior to point 515. Accordingly, the data available on input D455 at time 552 corresponds to Slot 0 data. Subsequently, at time 553, control 460 loads new values onto bus 470 and MASK 430.

At time 553, VSMSK has a value of '0,' SMSK has a value of '00000,' VDMSK has a value of '1,' and DMSK has a value of '1111.' Additionally at time 553, bus 470 has a value of '1' in the VD bit, a value of '00010' in the DST bits, and the VS and SRC bits have do not care values. The values of MASK 430 and BUS 470 selects CAM 410 entries having a value of 'XXXXXX100010.' Following the previous example, CAM 410 has a value of '100000100010.' Thus, the MASK 430 and bus 470 values at time 553 select entry 412 of CAM 410 and line 471 transitions to an active high, indicating a match.

At time 554, in response to the match signal, control 460 issues a read command and data from entry 422 of RAM 420 is transferred to control 460 via line 447. The data stored in entry 422 is the data received in time Slot 0. For one embodiment, limited switch 400 is coupled to SI 320. As previously described, prior to transmission SI 320 stores the parallel data for a single time slot in buffer TX326. Thus, the data read from entry 422 at time 554 is transmitted in Slot 2, resulting in the transfer of data from Slot 0 to Slot 2.

For illustrative purposes, the previous example outlines a data switching system used with a serial interface that results in a one time slot delay during the transfer of data between the serial interface and limited switch 400. For alternative embodiments, it is contemplated that there is no time slot delay during the transfer of data between the serial interface and limited switch 400. Accordingly, data is read from RAM 420 in the same time slot the data is desired for transmission. Alternatively, data is written into RAM 420 in the same time slot the data is received.

Figure 6:
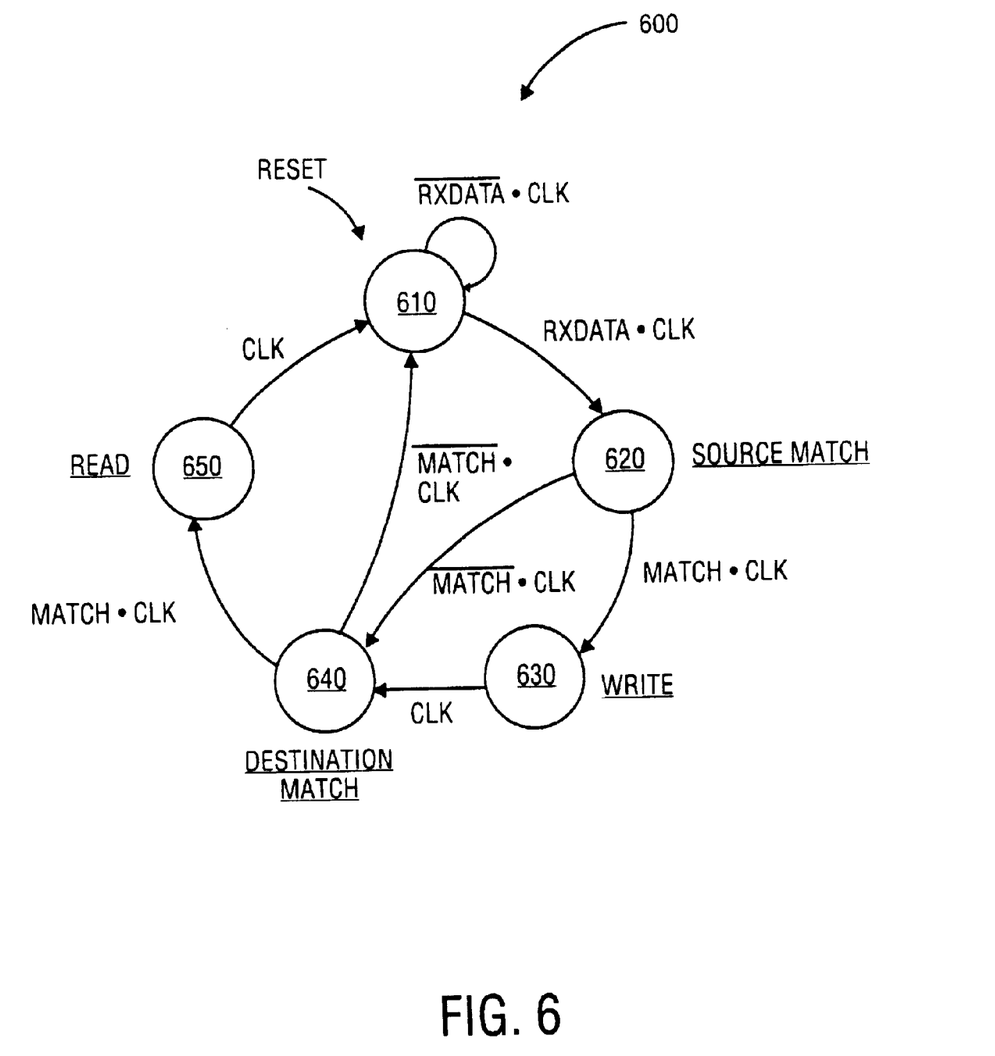
FIG. 6 illustrates one embodiment of a state diagram used to determine source and destination data for a given time slot.

FIG. 6 illustrates one embodiment of a state diagram used to determine source and destination data for a given time slot. In particular, state diagram 600 shows the state transitions of control 460. As illustrated in FIG. 6, the state transitions of state diagram 600 are controlled by signals RXDATA, MATCH, and CLK. Signal RXDATA indicates the arrival of new data, signal MATCH indicates a matching entry in a content addressable memory, and signal CLK is a clock signal used to synchronize the state transitions in state diagram 600.

For one embodiment, signals RXDATA, MATCH, and CLK corresponds to signals in limited switch 400. In particular, signal RXDATA corresponds to signal RXDATA 435 of limited switch 400. Thus, signal RXDATA indicates the availability of data on input D455. Specifically, RXDATA is set active high provided a serial interface coupled to limited switch 400 has completely stored all incoming serial data for a given time slot. Signal MATCH corresponds to the signal on line 471 of limited switch 400. Accordingly, signal MATCH is set to an active high signal, if an entry of CAM 410 matches with the contents of the masked bus 470. Signal CLK corresponds to a clock signal generated by control 460 to transfer data between RAM 420 and D455/D451. For one embodiment, CLK is generated by system 300 to operate LS 310 at a frequency ratio of SI 320. For an alternative embodiment, CLK is synchronized to a system clock of system 300.

State 610 is the initial state of state diagram 600. State 610 is entered during the reset of limited switch 400. For one embodiment, during state 610, controller 230 loads switching parameters into ESI 240 via bus 250. The switching parameters include the switching order of time slots between the TDM streams found on input D290 and output D270. For an alternative embodiment, during state 610, control 460 loads switching parameters into CAM 410. State diagram 600 remains in state 610 until RXDATA transitions to an active high. If RXDATA is an active high, then on a subsequent transition of the CLK signal, state diagram 600 transitions to state 620.

In state 620, control 460 determines if there is a source match. Specifically, the masked VS and SRC fields of bus 470 are compared to data in CAM 410. For one embodiment, control 460 sets the SRC bits of bus 470 to the value of the time slot preceding the current time slot. By setting the SRC bits of bus 470 to the value of a preceding time slot, control 460 overcomes the delay introduced by a serial interface coupled to limited switch 400—the delay introduced by a serial interface is illustrated in FIG. 5. If a matching CAM 410 entry exists, then on a subsequent transition of the CLK signal, state diagram 600 transitions to state 630. If a matching CAM 410 entry does not exist, then on a subsequent transition of the CLK signal, state diagram 600 transitions to state 640. For one embodiment, a matching CAM 410 entry is determined by line 471 transitioning to an active high.

In state 630, control 460 issues a write command to write data from D455 into RAM 420. In particular, control 460 asserts the W455 signal, thus transferring data from input D455 to RAM 420 via line 447. After issuing the write command, on a subsequent transition of the CLK signal, state diagram 600 transitions to state 640.

In state 640, control 460 determines if there is a destination match. Specifically, the masked VD and DST fields of bus 470 are compared to data in CAM 410. For one embodiment, control 460 sets the DST bits of bus 470 to the value of the time slot following the current time slot. By setting the DST bits of bus 470 to the value of a subsequent time slot, control 460 overcomes the delay introduced by a serial interface coupled to limited switch 400—the delay introduced by a serial interface is illustrated in FIG. 5. If a matching CAM 410 entry exists, then on a subsequent transition of the CLK signal, state diagram 600 transitions to state 650. If a matching CAM 410 entry does not exist, then on a subsequent transition of the CLK signal, state diagram 600 transitions to state 610. For one embodiment, a matching CAM 410 entry is determined by line 471 transitioning to an active high.

In state 650, control 460 issues a read command to transfer data from RAM 420 to D451. In particular, control 460 asserts the R440 signal, thus transferring data from RAM 420 to output D451 via line 447. After issuing the read command, on a subsequent transition of the CLK signal, state diagram 600 transitions to state 610.

Figure 7:
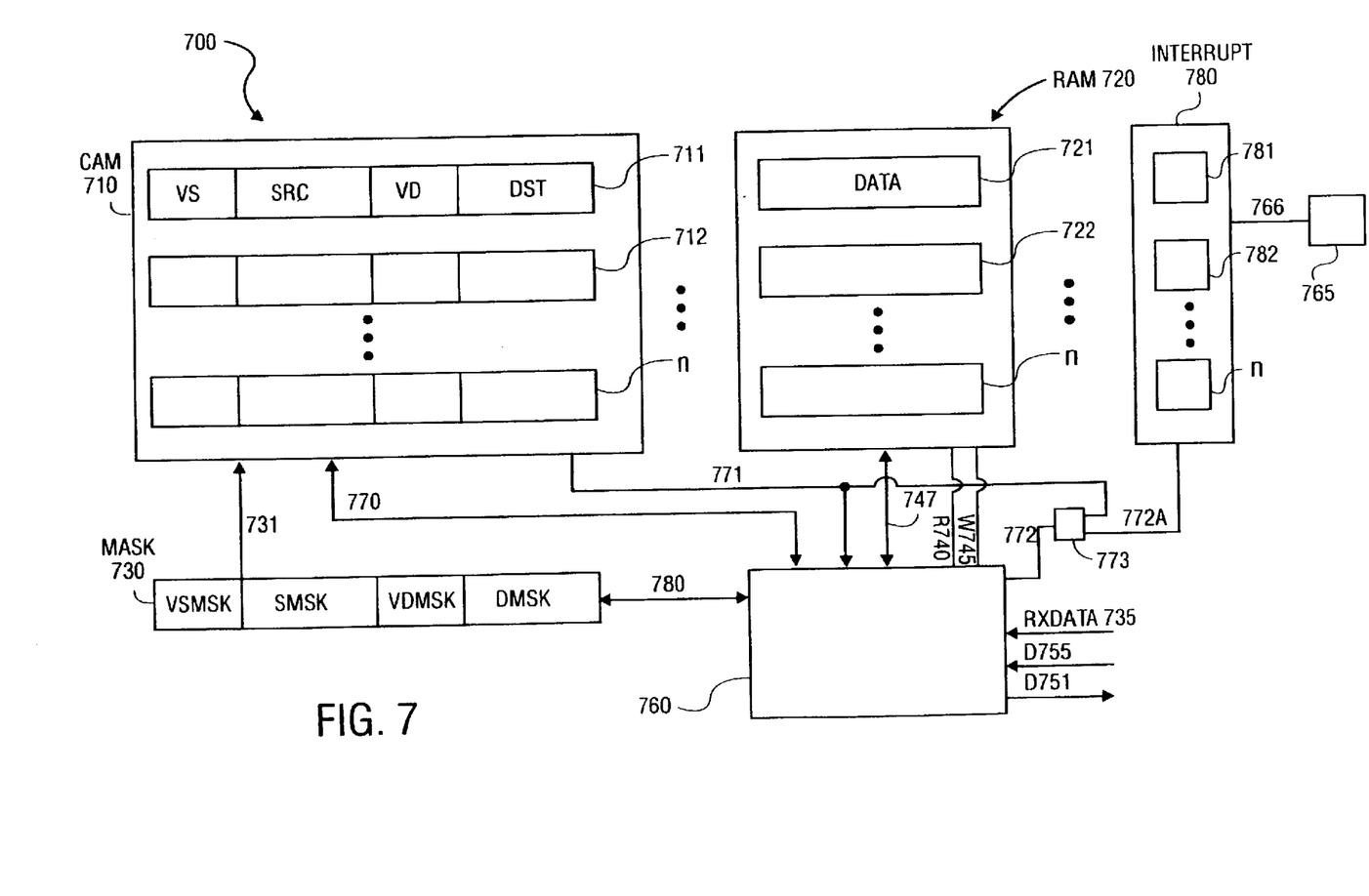
FIG. 7 shows one embodiment of a limited switch with message passing.

FIG. 7 shows one embodiment of a limited switch. In particular, limited switch 700 includes input D755, input RXDATA 735, and output D751. For one embodiment, limited switch 700 is used in conjunction with a serial interface, such as SI 320, to form the enhanced serial interface (SI 240) of TDM system 200.

Limited switch 700 allows the switching of data between TDM time slots. For one embodiment, a limited switch is also used to transfer messages between an external controller and peripheral devices coupled to the TDM data streams. As previously described, the insertion of data into a TDM stream by a limited switch or, alternatively, the termination of data in the limited switch is referred to as message passing.

For one embodiment, for example, system 300 is used to implement message passing. Accordingly, LS 310 is a limited switch with message passing and SI 320 is coupled to peripheral devices that pass messages and data via D370 and D390. For one embodiment, the data in message passing comprises codec mute signals, signals indicating coefficients of signal processing, gain control signals and 3D enable/disable signals. For alternative embodiments, the data in message passing comprises control signals used to determine the operation of peripheral devices coupled to the limited switch. For another embodiment, the transmitted messages are transferred from controller 230 to limited switch ESI 240 via bus 250, thus allowing controller 230 to control the operation of peripheral devices coupled to D270 and D290. For yet another embodiment, the transmitted messages are transferred from limited switch ESI 240 to controller 230 to via bus 250, thus allowing peripheral devices coupled to D270 and D290 to transfer messages to controller 230.

Limited switch 700 includes an associative memory—i.e. a content addressable memory array—(CAM 710), a random access memory array (RAM 720), a mask register (MASK 730), and a control (760). CAM 710 includes a plurality of entries (711, 712, . . . n). For one embodiment, each entry of CAM 710 includes a valid source bit (VS), source address bits (SRC), a valid destination bit (VD), and destination address bits (DST). The SRC address is used to identify a time slot corresponding to TDM data received by limited switch 700. Similarly, the DST address is used to identify a time slot corresponding to TDM data transmitted by limited switch 700. Additionally, the VS bit and the VD bit indicate that a specific CAM 710 entry includes a valid source address and a valid destination address, respectively.

For one embodiment, the number of entries in CAM 710 is determined by the number of time slots switched by limited switch 700. For example, in a thirty-two time slot TDM system with only four time slots switched during a given frame, CAM 710 includes four entries. For an alternative embodiment, the width of each entry (711, 712, . . . n) is determined by the number of time slots. For instance, a thirty-two time slot TDM system results in a five bit addressing scheme. Thus, both SRC and DST include five bits, resulting in each entry of AM 710 including twelve bits—1 (VS bit)+5 (SRC bits)+1 (VD bit)+5 (DST bits). For one embodiment, entries (711, 712, . . . n) are loaded into CAM 710 from control 760 via bus 770. Thus, bus 770 also comprises twelve bits—1 VS bit, 5 SRC bits, 1 VD bit, and 5 DST bits.

Limited switch 700 also includes RAM 720. RAM 720 serves as a buffer to store TDM data. Similar to CAM 710, RAM 720 includes a plurality of rows (721, 722, . . . n). Each row stores data for a given time slot. Additionally, each row in RAM 720 is associated with an entry in CAM 710. Thus, following the previous example, RAM 720 includes four rows, each row corresponding to a single entry of CAM 710. The width of each row (721, 722, . . . n) is determined by the data width of a time slot. For example, if each time slot transfers W bits of data, then each RAM row (721, 722, . . . n) stores W bits of data. For one embodiment, rows (721, 722, . . . n) are loaded into RAM 720 from control 760 via line 747. For an alternative embodiment, control 760 issues read and write commands to RAM 720 via signal lines R740 and W745, respectively. The read commands are operable to transfer data from RAM 720 to output D751. Alternatively, the write commands are operable to transfer from input D755 to RAM 720.

As further illustrated in FIG. 7, limited switch 700 also includes MASK 730 coupled to CAM 710 via line 731. MASK 730 includes a valid source mask bit (VSMSK), source address mask bits (SMSK), a valid destination mask bit (VDMSK), and destination address mask bits (DMSK). For one embodiment, the MASK bits of MASK 730 are loaded into MASK 730 from control 760 via line 780. Control 760 uses MASK 730, in conjunction with the data on bus 770, to determine if a specific CAM 710 entry includes matching data. To check the CAM 710 entries, the data stored in MASK 730 is used to determine which entries of bus 770 are compared against each entry in CAM 710. For example, for one embodiment, MASK 730 includes a VSMSK value of logic '1,' a SMSK value of logic '11111,' a VDMSK value of logic '0,' and a SMSK value of logic '00000.' Thus, only the VS and SRC data included on bus 770 are compared against the CAM 710 entries.

For one embodiment, if an entry of CAM 710 matches with the masked contents of bus 770, the matching CAM 710 entry and the corresponding RAM 720 row are identified as a match via signal line 771. For another embodiment, logic (not shown) internal to CAM 710 generates a match signal when the masked contents of bus 770 and CAM 710 are equal. Accordingly, the RAM 720 entry corresponding to the selected (i.e. matched) CAM 710 entry is identified. For yet another embodiment, the logic used to identify the matching CAM 710 entry include combinational logic consisting of exclusive-or, NOR, and NAND gates (not shown).

In contrast to limited switch 400, limited switch 700 also includes interrupt register 780 and logic 773. Similar to CAM 710, interrupt register 780 includes a plurality of rows (781, 782, . . . n). Each row in interrupt register 780 is associated with an entry in CAM 710 and RAM 720. Thus, following the previous example, interrupt register 780 includes four rows. For one embodiment, each row in interrupt register 780 stores a one bit value—an interrupt bit—indicating whether the associated RAM 720 entry includes switching data or a message for a given time slot. A logic value of '1' indicating a message in RAM 720. If an entry of CAM 710 matches with the masked contents of bus 770, the matching CAM 710 entry and the corresponding RAM 720 row are identified as a match via signal line 771. Additionally, if the matching entry of interrupt register 780 has a value of one, line 772a is set active high and logic 773 generates an interrupt signal on line 772. Accordingly, the RAM 720 entry corresponding to the selected (i.e. matched) CAM 710 entry is identified as a message. For one embodiment logic 733 is a NAND gate and signal 772a is generated by a logical OR of the interrupt bit values in interrupt register 780. For an alternative embodiment, line 722a is a pre-charged line and logic 773 includes combinational logic and a sense amplifier that discharges line 722a. In particular, if a matching entry of interrupt register 780 has a value of one, line 772a is discharged. Thus, provided line 771 indicates a match and line 722a is discharged and interrupt signal is generated on line 772. After the generation of the interrupt signal line 722a returns to the pre-charge value.

Data switching and message passing is controlled by control 760. Data switching in limited switch 700 follows the format and timing of data switching described above with respect to limited switch 400. Limited switch 700, however, also uses an interrupt signal to transmit or receive messages. Specifically, the interrupt signal allows limited switch 700 to store an incoming message in RAM 720. After the data is stored in RAM 720, limited switch 700 uses block 765 to identify the RAM 720 entry storing the message. Subsequently, the message is transferred to an external controller. The interrupt signal also allows limited switch 700 to transmit a message from an external controller to a peripheral device coupled to D751. In particular, the external controller stores a message in an entry of RAM 720. Subsequently, limited switch 700 uses the interrupt signal and block 765 to transmit the data to a peripheral device coupled to D755.

For one embodiment, limited switch 700 is used in system 300. Thus, controller 230 is used for message passing. Limited switch 700 uses the interrupt signal to inform controller 230 of a new message via bus 250. Limited switch 700 also uses block 765 to identify the RAM 720 entry used for message passing. Subsequently, the data in the identified RAM 720 entry is transferred to controller 230 via bus 250. Alternatively, data from controller 230 is transferred to the identified RAM 720 entry.

For example, for one embodiment, control 760 loads entries 711 and 760 of CAM 710 with a set of message passing requirements. Control 712 also loads entry 722 with a message from controller 230. Additionally, control 760 loads a logic value of '1' into entries 781 and 782. Subsequently, control 760 loads values on bus 770 and mask register 730. If the bus 770 masked SRC bits result in entry 711 being selected, control 760 stores the incoming data from input D755 in entry 721. Additionally, the selection of entry 711 results in both lines 771 and 772a transitioning to an active high. Thus, an interrupt signal is generated on line 772. As previously described, the interrupt signal notifies controller 230 of a message. Subsequently, controller 230 examines block 765 to identify the RAM 720 entry with the incoming message. For one embodiment, entries 781–n are coupled to block 765 via bus 766. The selection of a given entry (781–n) results in bus 766 generating a signal indicating the selected entry. Thus, in the present example, selection of entry 721 results in block 765 including the value '00.' Accordingly, controller 230 uses the '00' value stored in block 765 to transfer data from entry 721 to controller 230. For an alternative embodiment, after controller 230 reads the value stored in block 765, the contents of block 765 are reset.

Following the previous example, if the bus 770 masked DST bits result in entry 712 being selected. Thus, control 760 transfers the preloaded controller 230 message from entry 722 to output D755. Additionally, the selection of entry 712 results in both lines 771 and 772a transitioning to an active high and an interrupt signal is generated on line 772. As previously described, the interrupt signal notifies controller 230 of a message. Subsequently, controller 230 examines block 765 to identify the RAM 720 entry with the outgoing message. For one embodiment, entries 781–n are coupled to block 765 via bus 766. The selection of a given entry (781–n) results in bus 766 generating a signal indicating the selected entry. Thus, in the present example, selection of entry 722 results in block 765 including the value '01.' Accordingly, the '01' value stored in block 765 indicates to controller 230 that entry 722 is available for a new message. For one embodiment, controller 230 uses the RAM 720 entry identified in block 765 to transfer a new message to RAM 720. For an alternative embodiment, after controller 230 reads the value stored in block 765, the contents of block 765 are reset.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A message passing switch operable to perform message passing in a time division multiplexing system, the apparatus comprising:

a controller coupled to an input and an output, the controller configured to receive data on a data stream, wherein the data stream is transferred from the input to the output;

an interrupt register coupled to the controller, wherein the controller examines the interrupt register to determine if the data is a message or switching data;

an associative memory coupled to the controller, wherein the controller examines the associative memory to determine an insertion of the data in the data stream, wherein a size of the associative memory is determined by a number of time slots switched by the message passing switch; and a memory coupled to the controller, wherein the memory is operable to store a subset of the components of the data stream.

2. The apparatus of claim 1, wherein the apparatus further comprises a mask register, the controller operable to use the mask register to examine the associative memory.

3. The apparatus of claim 1, wherein each time slot is operable to transmit a component of data stream.

4. A method for implementing a message passing switch, the method comprising:

transferring a message from an external device to the message passing switch;

examining an associative memory to determine if data should be stored in a time slot, wherein a size of the associative memory is determined by a number of time slots switched by the message passing switch;

determining if the message should be transmitted by examining an interrupt register; and transmitting the message in the time slot.

5. The method of claim 4 wherein the message passing switch includes a limited switch operable to transfer data in a time division multiplexing system.

6. The method of claim 4 wherein the message includes control signals.

7. The method of claim 4 wherein the time slot includes a time period in a frame.

8. A method for implementing a message passing switch, the method comprising:

configuring a size of an associative memory based on a number of a plurality of time slots switched by the message passing switch;

receiving a subset of a TDM (Time Division Multiplexing) stream, the TDM stream having the plurality of time slots configured to include a message and a switching data, the subset of the TDM stream being from a first time slot of the plurality of time slots;

determining if the subset of the TDM stream includes the message by examining an interrupt register;

storing the subset of the TDM stream it a memory location based on an entry in the associative memory; and transferring the subset of the TDM stream to a second time slot in the TDM stream.

9. The method of claim 8 further comprising transferring the subset of the TDM stream in the second time slot to an external device.

10. The method of claim 8 wherein the message includes operational data from a peripheral device coupled to the message passing switch.

11. A apparatus operable to perform message passing in a time division multiplexing system comprising:

a control coupled to an input and an output, the control configured to insert a message and a streaming data into a data stream, wherein the data stream is transferred from the input to the output;

an interrupt register coupled to the control, wherein the control examines the interrupt register to determine the insertion of a message in the data stream;

a memory coupled to the controller, wherein the memory is operable to store a subset of the components of the data stream; and an associative memory having a size based on a number of time slots switched by the time division multiplexing system.

12. The apparatus of claim 11, wherein the apparatus further comprises a mask register, the control operable to use the mask register to examine the associative memory.

13. The apparatus of claim 11, wherein the data stream comprises a plurality of time slots, each time slot operable to transmit a component of data.

* * * * *

UNITED STATES PATENT AND TRADEMARK OFFICE
CERTIFICATE OF CORRECTION

PATENT NO. : 6,570,887 B2
DATED : May 27, 2003
INVENTOR(S) : Mehta et al.

It is certified that error appears in the above-identified patent and that said Letters Patent is hereby corrected as shown below:

<u>Column 8,</u>
Line 3, delete "1111", insert -- 11111 --.

<u>Column 10,</u>
Line 38, delete "AM", insert -- CAM --.

Signed and Sealed this

Twenty-fourth Day of February, 2004

JON W. DUDAS
*Acting Director of the United States Patent and Trademark Office*